United States Patent [19]
Florek et al.

[11] Patent Number: 5,189,486
[45] Date of Patent: Feb. 23, 1993

[54] ECHELLE POLYCHROMATOR

[75] Inventors: Stefan Florek; Helmut Becker-Ross, both of Berlin, Fed. Rep. of Germany

[73] Assignee: Zentralinstitut für Optik und Spektroskopie, Berlin-Adlershof, Fed. Rep. of Germany

[21] Appl. No.: 657,096

[22] Filed: Feb. 15, 1991

[30] Foreign Application Priority Data

Feb. 15, 1991 [DD] German Democratic Rep. ... 337865

[51] Int. Cl.[5] ............................................. G01J 3/28
[52] U.S. Cl. ............................................. 356/328
[58] Field of Search ........ 356/326, 328, 307, 331–334, 356/305, 324

[56] References Cited

U.S. PATENT DOCUMENTS

| | | | |
|---|---|---|---|
| 3,457,416 | 7/1969 | Elliott | 356/328 |
| 3,658,423 | 4/1972 | Elliot . | |
| 4,391,523 | 7/1983 | Hildebrand et al. | 356/328 |
| 4,690,559 | 9/1987 | Florek et al. | 356/328 |
| 4,820,048 | 4/1989 | Bernard | 356/328 |

Primary Examiner—F. L. Evans
Assistant Examiner—K. P. Hantis
Attorney, Agent, or Firm—Schweitzer Cornman & Gross

[57] ABSTRACT

The invention relates to an Echelle polychromator and can be employed in instruments for the spectrophotometric investigation of radiation sources. It is characterized in that, connected in series with the polychromator, there is a dispersive and polychromatic illuminating device, which is formed from an entrance slit arrangement, collimator optics, prism and camera optics, the entrance slit arrangements of the polychromator and of the illuminating device consisting of a main slit for limiting the bundle in the grating dispersion direction and a transverse slit for limiting the bundle in the direction of the dispersion of the prism in the Echelle polychromator. The whole of the wavelength range, which is to be processed by the polychromator, is imaged completely with negligible aberration on the transverse slit of the Echelle polychromator as a spectrum of the illuminating device. The dispersion of the illuminating device runs in the direction of the transverse dispersion of the prism of the Echelle polychromator. The dispersion-induced geometric width of the spectrum of the illuminating device for the whole of the wavelength region that is to be processed by the polychromator is less than the width of the transverse slit of the Echelle polychromator. Parts of the bundle of rays of the spectrum of the illuminating device are blocked out by the transverse slit of the Echelle polychromator.

5 Claims, 2 Drawing Sheets

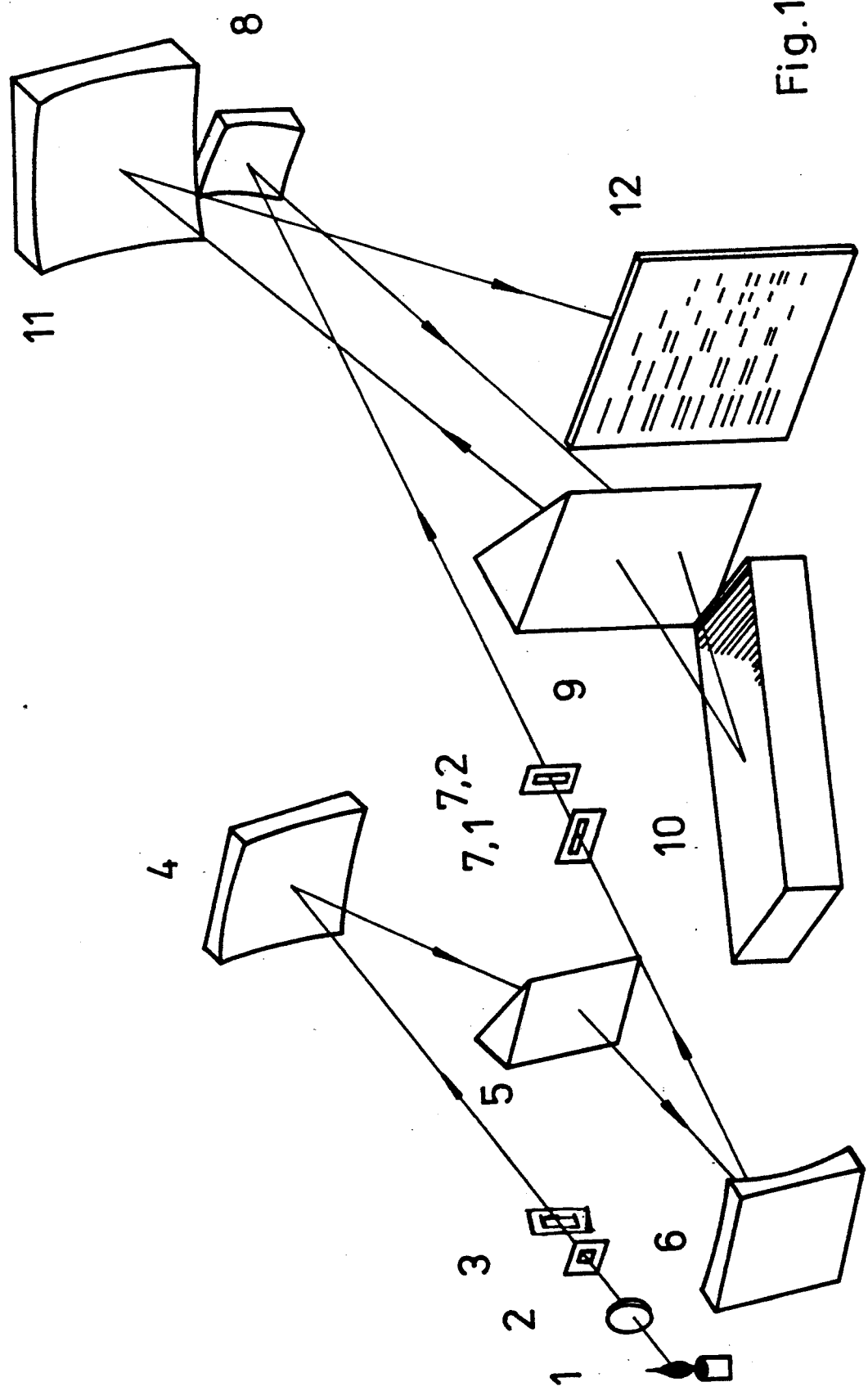

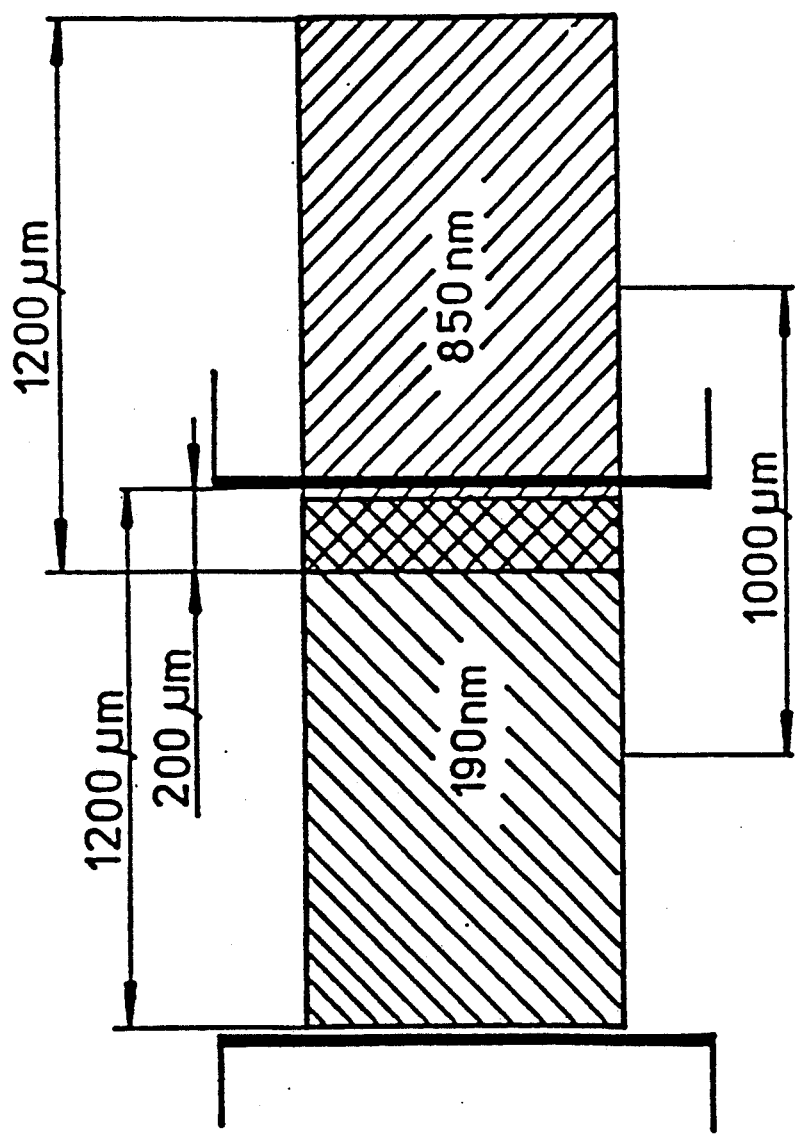

ECHELLE POLYCHROMATOR

FIELD OF THE INVENTION

The invention relates to an Echelle polychromator for use in instruments for the spectrophotometric investigation of radiation sources.

BACKGROUND OF THE INVENTION

A number of different Echelle polychromator arrangements are known (e.g. U.S. Pat. Nos. 3,658,423; 4,391,523; 4,690,559; and 4,820,048). They have in common the feature that the individual diffraction orders of the Echelle grating must be separated from one another by at least one additional transverse dispersion element within the spectrometer, a two-dimensional spectrum being formed.

The distances between adjacent order lines in the spectrum arise out of the free spectral region of the Echelle diffraction orders and the course of the dispersion of the transverse dispersion element. Prisms are used exclusively for the transverse dispersion in Echelle polychromators which must cover an extended wavelength range, due to their high transmission and their unambiguous dispersion during the diffraction of light. This, however, necessarily results in an uneven separation of the order lines. Corresponding to the course of the dispersion of all prism materials, the order separation increases by a multiple from the long wavelength end of the spectrum at low order numbers to the short wavelength end at high order numbers. The width of the order lines is determined in the Echelle polychromator by the width of the transverse slit, which as entrance slit component limits the light bundle in the direction of the prism dispersion.

In all known Echelle polychromator arrangements which use a prism for the order separation, heretofore the width of the transverse slit has always been selected so that the longest wavelength order lines in the Echelle spectrum are adjacent to one another with only a minimum space between them to allow for distortion aberration.

Since the width of the transverse slit is the same for all wavelengths, the size of the free areas without informational content between the orders increases in the spectrum as the order number increases. Due to a wider transverse slit, these free areas could be used to increase the luminosity. However, the overlapping of the orders in the long wavelength region of the spectrum, which is associated with this, can generally not be tolerated.

The luminosity of an Echelle polychromator is thus limited by the small width of the transverse slit and is constant over the whole of the spectral range. The diffraction efficiency of the Echelle grating, the reflection coefficients of the mirror optics, and the transmission of the prism material, however, decrease in the direction of the shorter wavelengths.

Moreover, the signal-to-noise ratio in spectrophotometric measurements in the ultraviolet region of the spectrum, particularly in the case of sources with maximum radiation density in the visual or NIR range, is reduced further by an increased level of scattered light and is insufficient in many applications.

SUMMARY OF THE INVENTION

It is an object of the invention to increase the signal-to-noise ratio in spectrophotometric measurements with an Echelle polychromator, particularly in the ultraviolet range of the spectrum and to counteract the decreasing overall effectiveness of the spectrometer in this region of the spectrum. This is accomplished, in accordance with the present invention, by an arrangement for an Echelle polychromator, which makes possible the utilization of the free areas which are present in the focal area of the polychromator and result from the uneven separation of the diffraction orders, thus increasing the luminosity.

The above objective of the present invention is accomplished by connecting in series between the light source and a conventional Echelle polychromator (hereinafter also referred in some places as the "basic device"), a dispersive and polychromatic illuminating device (hereinafter also referred in some places as the "supplemental device") for producing a dispersion-induced geometric width of radiation spectrum for the basic device. Since some components that are conventional optical components per se and are available in a same or in somewhat different form, both in the basic device as well as in the supplemental device, therefore, the word "basic", or "supplemental", as the case may be, designates whether the particular component so designated, is in the basic device or in the supplemental device.

The basic device of the present invention is a conventional Echelle polychromator having a basic entrance slit arrangement, basic collimator optics, a basic prism, an Echelle grating, basic camera optics, and a detector arrangement The supplemental device of the present invention comprises a supplemental entrance slit arrangement, supplemental collimator optics, and supplemental camera optics. The basic as well as the supplemental entrance slit arrangements each comprise a main slit for limiting in the direction of the grating dispersion the bundle of radiation emitted by a radiation source, and a transverse slit for limiting the light bundle of emitted radiation in the direction of the dispersion of the prism in the basic device. The entire wavelength range that is to be processed by the basic device is imaged substantially completely and with negligible aberration on the basic transverse slit as a radiation spectrum of the supplemental device. The radiation dispersion of the supplemental device runs in the direction of the transverse dispersion of the basic prism, and the dispersion-induced geometric width of the radiation spectrum of the supplemental device for the entirety of the wavelength range region that is to be processed by the basic device, is less than the width of its transverse slit. Parts of the bundle of light rays from the supplemental device are blocked out by the basic transverse slit.

The main slit and the transverse slit of the entrance slit arrangement of the polychromator can be disposed at a different distance from the collimator optics of the polychromator and the collimator optics and the camera optics of the illuminating device can be spherical or toroidal concave mirrors. In this case, the tangential image of the entrance slit arrangement of the illuminating device lies in the main slit of the polychromator while the sagittal image of the entrance slit arrangement of the illuminating device lies in the transverse slit of the polychromator.

The width of the transverse slit of the Echelle polychromator can be selected so that it corresponds to the largest geometric distance between two adjacent diffraction orders in the Echelle spectrum and not to the smallest such distance as before.

When the image of the transverse slit of the illuminating device for the shortest wavelength of the Echelle spectrum just fills the width of the transverse slit of the Echelle polychromator, then the luminosity of the system as a whole is a maximum for this wavelength.

Bundles of larger wavelengths are blocked out by the transverse slit of the Echelle polychromator, depending on the dispersion-induced geometric width of the spectrum that is generated by the illuminating device.

The utilization of the area of the spectrum in the Echelle polychromator is optimum, when the dispersion-induced geometric width of the spectrum of the illuminating device for the midpoint beams of the boundary wavelengths of the Echelle spectrum coincides exactly with the difference between the distances of neighborhood orders at these wavelengths between the greatest and smallest order separation in the Echelle spectrum.

Due to the selective shading, the effective bundle width at the location of the transverse slit of the Echelle polychromator decreases at a slit knife-edge of the transverse slit with increasing wavelength in proportion to the decreasing distances between the orders in the Echelle spectrum. The luminosity of the system as a whole is reduced for the long wavelength region of the spectrum. By increasing the linear dispersion of the illuminating device, the effective width of the transverse slit of the polychromator and, with that, the order line width in the long wavelength part of the Echelle spectrum can be reduced further. A variation in the luminosity of up to two orders of magnitude is thus possible within the spectrum. When investigating sources with a relatively high radiation density in the long wavelength region of the spectrum, this measure can be used to lower the scattered light level in the polychromator and to improve further the signal-to-noise ratio in the ultraviolet region.

The radiation detector in the focal plane of the Echelle polychromator must advisably be adapted to the geometric relationships in the Echelle spectrum.

The inventive solution can also be employed in polychromators with a one-dimensional dispersion.

DESCRIPTION OF THE DRAWINGS

The invention is described below in greater detail by an example of its operation all illustrated in the accompanying drawing, in which:

FIG. 1 is a diagrammatic representation of the optical arrangement of an Echelle polychromator with an illumination arrangement connected in series; and FIG. 2 is a diagrammatic representation of the limitation of the bundle of rays at the slit arrangement of the new and improved Echelle polychromator.

DETAILED DESCRIPTION OF THE INVENTION

The radiation from a light source 1 is imaged by means of an achromatic combination of lenses 2 on the entrance slit arrangement 3 of the supplemental dispersive illuminating device. The spherical supplemental collimator optics 4, the prism 5 and the spherical camera optics 6 are in a Czerny-Turner arrangement and produce a coma-free astigmatic image of the supplemental entrance slit arrangement 3 of the illuminating device at the basic location of the entrance slit arrangement 7.1 with 7.2 of the basic Echelle polychromator.

The tangential image is in the basic main slit 7.1 of the polychromator. The sagittal image is formed in the plane of the basic transverse slit 7.2.

Each of the two entrance slit arrangements 3 and 7.1 with 7.2 consists of a main slit and a transverse slit, each main slit serving to limit the bundle of rays in the main dispersion direction and each transverse slit serving to limit the bundle of rays in the transverse dispersion direction.

In the illustrated arrangement, the basic main slit 7.1 and the basic transverse slit 7.2 of the basic entrance slit arrangement of the Echelle polychromator are disposed one behind the other. On the other hand, for the supplemental entrance slit arrangement 3 of the dispersive illuminating device, the slit knife-edges of the supplemental main slit and the supplemental transverse slit lie in one plane. The supplemental dispersion prism 5 is arranged to provide a spectrum of low dispersion perpendicular to the basic transverse slit 7.2. Parts of the bundles of the spectrum are blocked out by the basic transverse slit 7.2. The radiation passing through the basic main slit 7.1 and the basic transverse slit 7.2, passes through the spherical basic collimator optics 8, the transverse basic dispersion prism 9, the Echelle grating 10 and the basic camera optics 11 and is imaged in the focal plane on the detector arrangement 12 as a two-dimensional spectrum. The optical components are disposed in a "tetrahedral arrangement".

The important parameters of all the optical components are given hereafter in Table 1. The dispersive illuminating device is adjusted so that the radiation of the shortest wavelength of the whole spectral range with $\lambda = 190$ nm can pass, exactly without shading, through the basic main slit 7.1 and the basic transverse slit 7.2. For this wavelength, the sagittal image of the supplemental entrance slit arrangement 3 of the illuminating device lies exactly in the basic transverse slit 7.2 of the polychromator. For the reproduction scale of 1:1, the two transverse slits have a width of 1,200 μm, which corresponds to the separation of the diffraction orders 124 and 125 at the short wavelength boundary of the Echelle spectrum (see FIG. 2).

The dispersion-induced geometric width of the spectrum of the illuminating device for the spectral range of the polychromator from 190 to 850 nm amounts exactly to 1,000 μm at the place of the basic transverse slit 7.2. With that, precisely 1,000 μm is dimmed out from the bundle with the longest wavelength of =852 nm by a slit knife-edge of the basic transverse slit 7.2, so that a residual bundle of rays 200 μm wide can pass through the basic transverse slit 7.2. This width corresponds exactly to the separation between the nearest neighbor diffraction orders 27 and 28 at 852 nm in the Echelle spectrum.

When the same materials are used for the supplemental prism 5 and basic prism 9, the resulting virtual width of the transverse slit corresponds at each wavelength exactly to the separation between the orders at the corresponding place in the Echelle spectrum. All diffraction orders in the spectrum lie close together, the order height increasing continuously in the direction of the shorter wavelengths. In the case of the inventive use of the dispersive and polychromatic illuminating device, the luminosity for the wave length of 193 nm is larger by a factor of 6 than that obtained with a conventional illumination of the spectrometer without having to change the parameters of the Echelle polychromator.

To utilize the advantage of the higher luminosity, the detector arrangement is constructed as a combination of individual CCD (charge coupled devices) line sensors with adapted pixel geometry, which permit the range of interest of the Echelle spectrum to be measured.

TABLE 1

| Illuminating (supplemental) device | |
|---|---|
| Entrance slit arrangement | Width of transverse slit = 1,200 μm |
| | Width of main slit = 60 μm |
| Collimator optics: | spherical R = 200 mm |
| Camera optics: | |
| Prism: | ε = 5° |
| Basic Echelle Polychromator | |
| Entrance slit arrangement | Width of transverse slit = 1,200 μm |
| | Width of main slit = 40 μm |
| Collimator optics: | spherical R = 1,000 mm |
| Camera optics: | |
| Prism: | ε = 25° |
| Echelle grating: | 75 grooves/mm, $\Theta_B$ = 64.2°, α = 68.2° |
| Spectrum | area = 65 × 50 mm² |
| | order separation at 190 nm: 1,200 μm |
| | 250 nm: 670 μm |
| | 500 nm: 270 μm |
| | 850 nm: 210 μm |

We claim:

1. In an Echelle polychromator, having a basic Echelle polychromator unit that has a basic entrance slit arrangement of a basic main slit and a basic transverse slit that is disposed transversely to the basic main slit, basic collimator optics, a basic prism, an Echelle grating, basic camera optics, and a detector arrangement, the improvement comprising:

(a) a dispersive and polychromatic illuminating supplemental device for producing a radiation spectrum having a dispersion-induced geometric width, said supplemental device being connected in series before the basic Echelle polychromator, the supplemental device comprising a supplemental entrance slit arrangement comprised of a supplemental main slit and a supplemental transverse slit that is disposed transversely to the basic main slit, supplemental collimator optics, a supplemental prism having a transverse dispersion, and supplemental camera optics;

(b) said basic and said supplemental entrance slit arrangements each comprise a main slit for limiting in the direction of the grating dispersion the bundle of radiation emitted by a source, and a transverse slit for limiting the bundle of emitted radiation in the direction of the dispersion of the basic prism, (c) the entirety of the wavelength range to be processed by the basic polychromator is imaged substantially completely with minimal aberration on the basic transverse slit as a radiation spectrum of the supplemental device;

(d) the radiation dispersion of the supplemental device runs in the direction of the transverse dispersion of the basic prism;

(e) the dispersion-induced geometric width of the spectrum of the radiation from the supplemental device for the entirety of the wavelength region to be processed by the basic polychromator, is less than the width of the basic transverse slit; and (f) parts of the bundle of radiation of the spectrum of the supplemental device are blocked out by the basic transverse slit.

2. The improvement in the Echelle polychromator of claim 1, wherein:

(a) said basic main slit and said basic transverse slit are disposed at respectively different distances from the basic collimator optics;

(b) said supplemental collimator optics and said supplemental camera optics are spherical or toroidal concave mirrors, whereby the tangential image of said supplemental entrance slit arrangement lies in the basic main slit, and the sagittal image of said supplemental entrance slit arrangement lies in the basic transverse slit.

3. The improvement in the Echelle polychromator of claim 1, wherein the width of said basic transverse slit is equal to the distance between the two shortest wavelength diffraction orders in the spectrum of the basic Echelle polychromator.

4. The improvement in the Echelle polychromator of claim 1, wherein the width of said supplemental transverse slit is determined to provide a monochromatic image of the shortest wavelength of the wavelength range to be processed by the basic polychromator exactly to illuminate the basic transverse slit.

5. The improvement in the Echelle polychromator of claim 1, wherein the dispersion induced width of the spectrum of the supplemental device for the entirety of the wavelength range which is to be processed by the basic polychromator is equal to the difference between the greatest and smallest order separation in the Echelle polychromator.

* * * * *